United States Patent
Watanabe

[11] Patent Number: 6,157,483
[45] Date of Patent: Dec. 5, 2000

[54] BINOCULAR WITH LOW MAGNIFICATION AND WIDE FIELD OF VISION

[75] Inventor: Naomi Watanabe, Urawa, Japan

[73] Assignee: Kamakura Koki Kabushiki Kaisha, Warabi, Japan

[21] Appl. No.: 08/960,035

[22] Filed: Oct. 29, 1997

[30] Foreign Application Priority Data

Oct. 20, 1996 [JP] Japan ................................. 8-011002

[51] Int. Cl.$^7$ ................................................. G02B 23/00
[52] U.S. Cl. ...................... 359/431; 359/419; 359/407; 396/351; 396/352; 396/386
[58] Field of Search ............................. 359/407, 419, 359/431, 831, 833, 834, 835, 836, 861; 396/351, 352, 386, 384, 432

[56] References Cited

U.S. PATENT DOCUMENTS 3,250,195  5/1966  Maitani ................................. 396/386
5,599,482  2/1997  Fenzi ................................. 252/389.52

*Primary Examiner*—Cassandra Spyrou
*Assistant Examiner*—Craig Curtis
*Attorney, Agent, or Firm*—Christensen O'Connor Johnson Kindness PLLC

[57] ABSTRACT

The invention aims to provide binoculars suitable to be used in a theater or a sports stadium, which can provide a wide and bright field of view on one hand, and which are compact and lightweight with improved portability and maneuverability on the other hand. Inverse reflection of an image is achieved by providing optical systems of inverse reflection, each comprising a pair of specular reflectors opposed to each other on an object side and an eyepiece side, respectively, so that an optical axis of light exiting the optical system of inverse reflection on the eyepiece side extends in parallel with an optical axis of light entering the optical system of inverse reflection on the object side, and one or more object lens(es) is or are placed on one or more path(s) selected from optical paths of reflection from respective specular reflectors forming the optical systems of inverse reflection.

11 Claims, 5 Drawing Sheets

BINOCULAR WITH LOW MAGNIFICATION AND WIDE FIELD OF VISION

FIELD OF THE INVENTION

This invention relates to a binocular which has low power but presents a wide and bright field of view.

BACKGROUND OF THE INVENTION

Prior Art

In order that fast movements of players can be followed in a large sports field, for example, in watching a soccer or rugby game, or a relatively wide theater stage can be seen from one wing to the other wing, binoculars which have low power but present a wide angle of view are necessary.

As such binoculars of low power, so-called opera glasses have usually been used. While the opera glasses are conveniently compact and lightweight since they comprise so-called Galilean optical system employing a convex lens as an object lens and a concave lens as an eyepiece, it is well known that its relatively dark field of view and relatively small angle of view can not meet the above-described demands.

On the other hand, binoculars with high power generally employ an optical system of inverse reflection comprising a plurality of prisms to obtain a power as high as 7 or higher. However, an actual angle of view presented by such arrangement is limited to the order of 10° and such small angle of view makes it impossible to follow the speedy movement of an object to be viewed.

Although the antinomy in optics that higher the power smaller the visual angle may be unavoidable, it is preferred to employ an object lens having a focal distance as short as possible in order to obtain a wide field of view. However, if a prism is used as an erecting system, a focal distance of the object lens must cover the length of optical path occupied by the prism, and thus the binoculars become correspondingly bulky. In addition, the volume of the prism affects the volumes of both the object lens and the eyepiece, resulting in bulky and weighty binoculars requiring correspondingly high costs of manufacturing.

SUMMARY OF THE INVENTION

In view of the problems as described above, it is the principal object of the invention to provide a compact and lightweight binocular which has low power but presents a wide and bright field of view.

The object set forth above is achieved, according to the invention, by a compact and lightweight binocular with low power but with a wide field of view, having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection; and an object lens placed in one of respective optical paths of reflection extending from the first specular reflector to the fourth specular reflector so as to be oriented orthogonal to the corresponding optical axis of reflection.

Typically, the object lens is placed in between said first and second specular reflectors so as to be oriented orthogonal to the optical axis of reflection from said first specular reflector.

Considering a design of an outer shell containing these optical systems, it is also possible to place said object lens on the other optical paths of reflection, for example, on the optical paths of reflection extending between the third and fourth specular reflectors forming together the optical system of inverse reflection on the eyepiece side, or between the optical system of inverse reflection on the object side and the optical system of inverse reflection on the eyepiece side, more specifically, between the second specular reflector and the third specular reflector.

Alternatively, a plurality of object lenses may be respectively placed in plural optical paths of reflection, selected from three optical paths of reflection, i.e., the optical path of reflection extending between the first and second specular reflectors, the optical path of reflection extending between the second and third specular reflectors, and the optical path of reflection extending between the third and fourth specular reflectors, so that these object lenses are oriented orthogonal to the respective optical paths of reflection.

In such a case, all of these first through fourth specular reflectors have their effective surfaces in the form of mirrors covered with anticorrosive and moisture-proofing film.

In order that all these first through fourth specular reflectors can be easily mounted and stabilized for a long period of use, a housing is molded integrally with these specular reflectors so that said object lens(es) may be thereafter mounted therein.

To obtain a binocular which is compact and lightweight as a whole, an intermediate lens is provided in the form of a collective lens adjacent to the exit surface of the fourth specular reflector so that the focal distance of the object lens is shortened.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
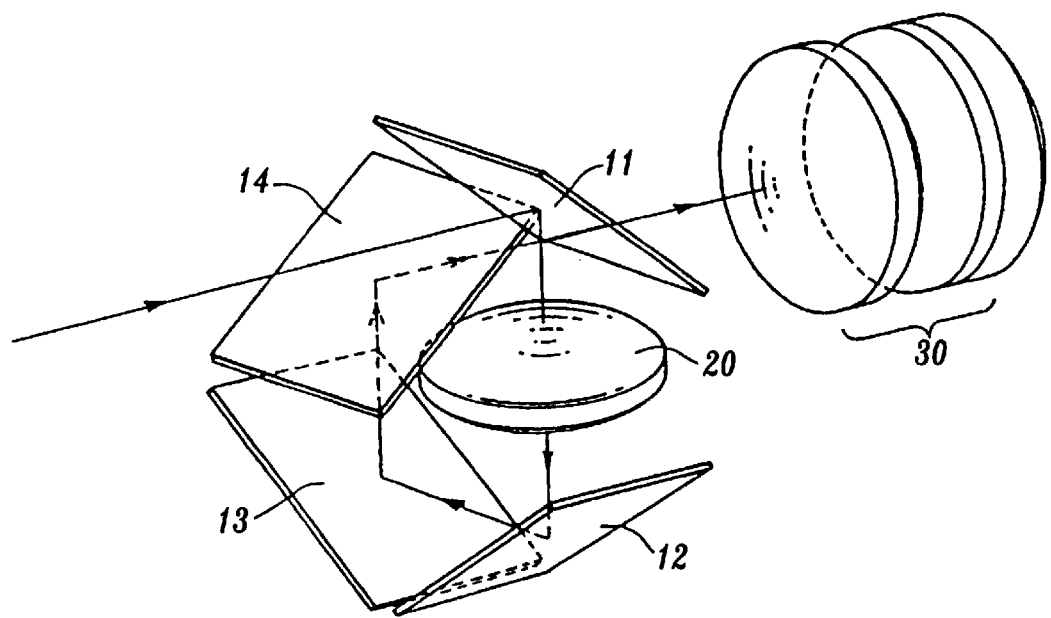
FIG. 1 is a perspective view showing a principal optical system in the binocular according to the invention as viewed from the object side.
Figure 2:
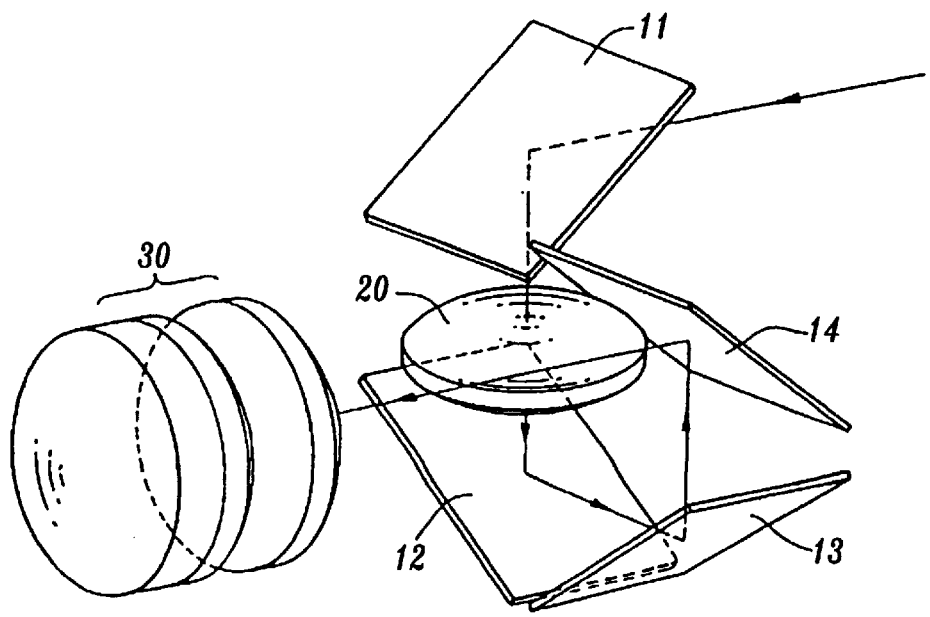
FIG. 2 is a perspective view showing said principal optical system in the binocular according to the invention as viewed from the eyepiece side.
Figure 3:
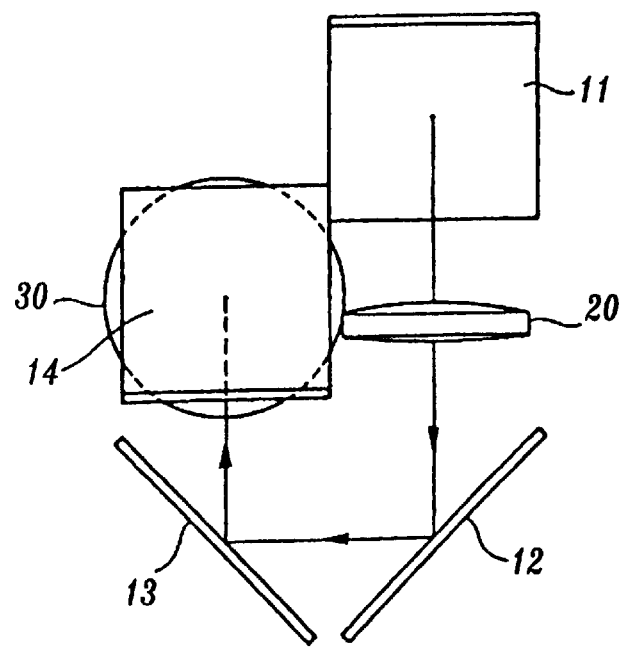
FIG. 3 is a front view showing relative positions of respective elements constituting said principal optical system in the binocular according to the invention.
Figure 4:
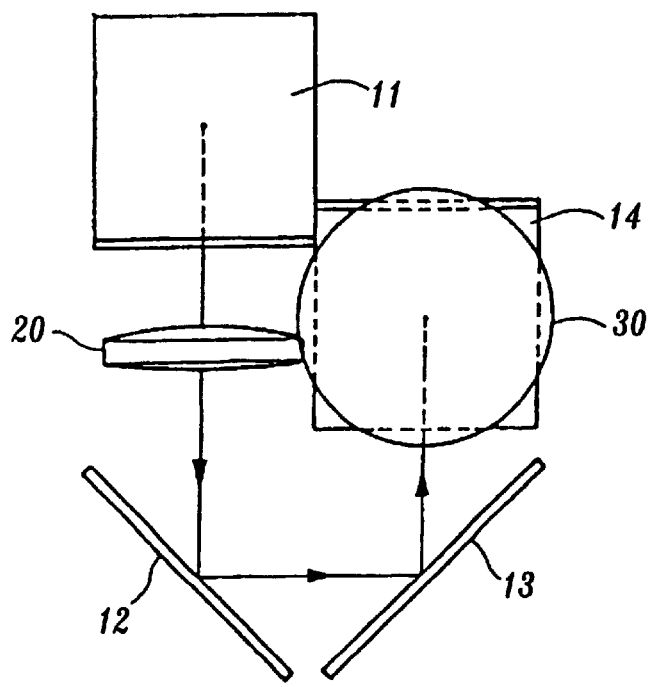
FIG. 4 is a rear view showing the relative positions of the respective elements constituting said principal optical system in the binocular according to the invention.
Figure 5:
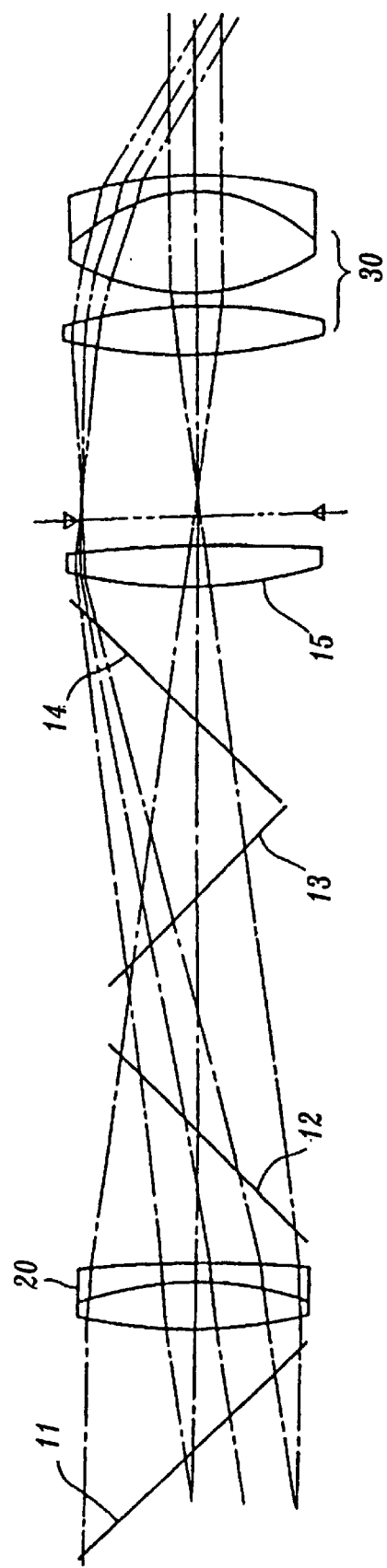
FIG. 5 is an optical exploded view showing an arrangement of the respective elements constituting said optical system and optical paths formed by these elements in the binocular according to the invention.
Figure 6:
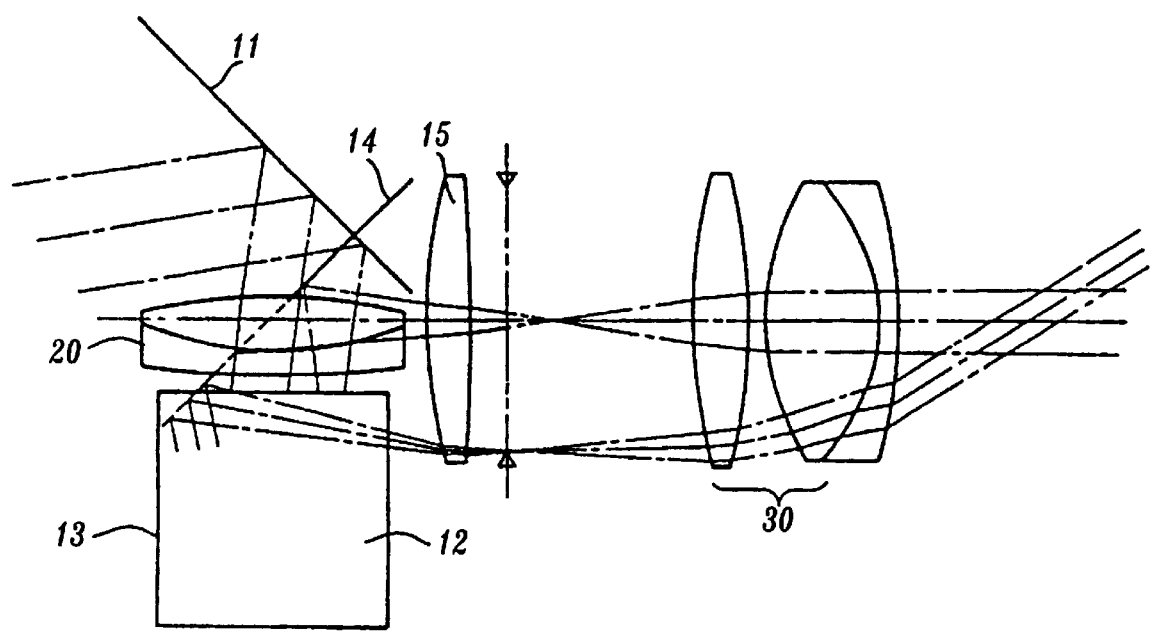
FIG. 6 is a side view showing the actual optical paths formed in the binocular according to the invention.
Figure 7:
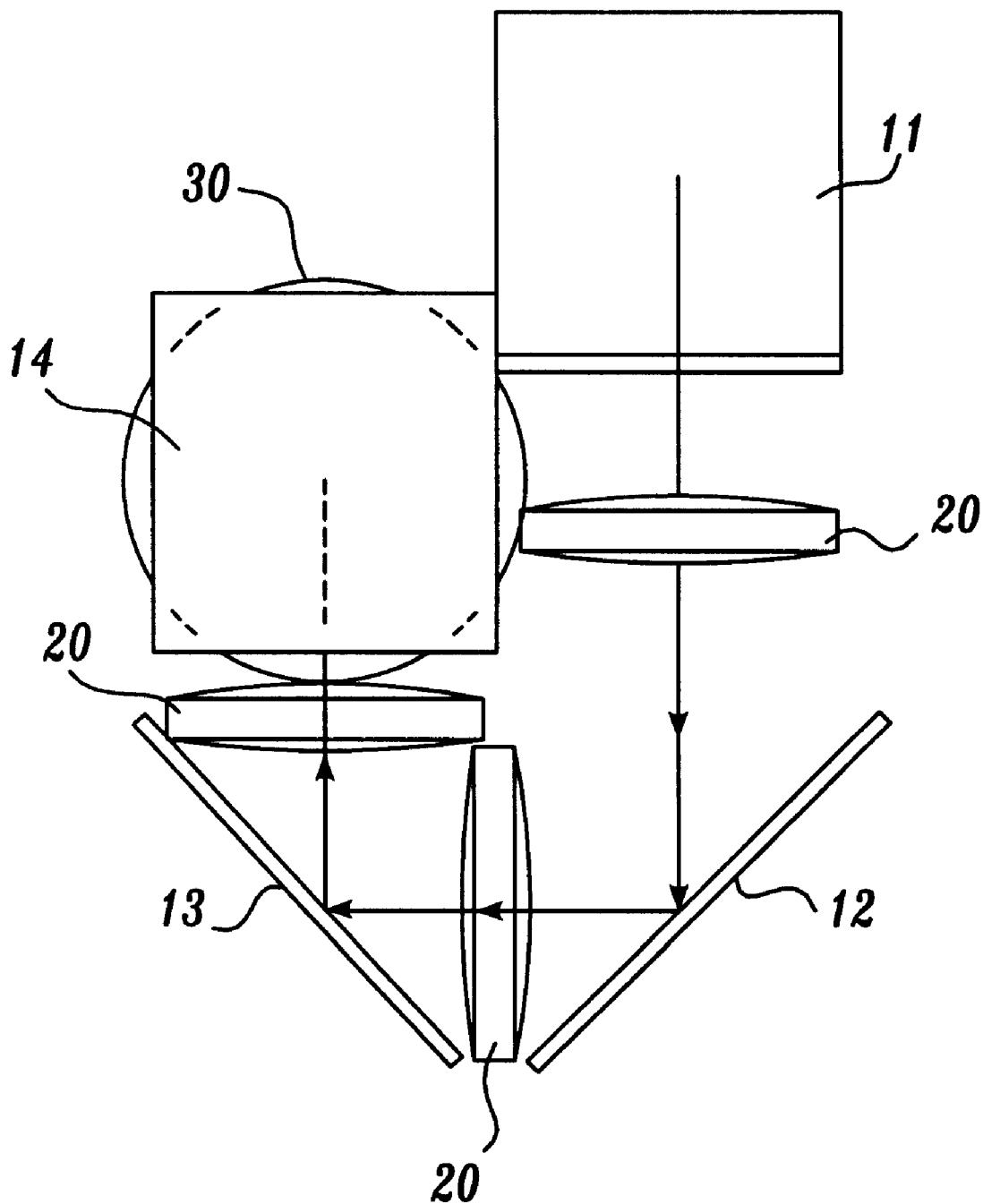
FIG. 7 is a front view showing relative positions of respective elements including three object lenses placed on three optical path sections in a binocular according to the invention.

Details of a correlative arrangement of principal optical elements characterizing the invention will be more fully understood from the description of an embodiment in which an object lens is placed in between a first specular reflector and a second specular reflector in reference with FIGS. 1 and 2, each showing an arrangement of respective optical elements in perspective view, and in reference with FIGS. 5 and 6, each showing an optical path of the light entering the first specular reflector and exiting an eyepiece in side view.

The preferred embodiment will be described in reference with these accompanying drawings. It should be understood that the accompanying drawings show one of paired optical structures forming the binoculars and the other optical structure is placed symmetrically to the optical structure shown.

Referring to the accompanying drawings, reference numerals 11, 12, 13, 14 respectively designate a first specular reflector, a second specular reflector, a third specular reflector and a fourth specular reflector, and these elements will be referred to as a first mirror, a second mirror, a third mirror and a fourth mirror in the following description.

The first mirror 11 is placed on the object side at an angle of 45° with respect to an optical axis of incidence and the second mirror 12 is placed so as to receive the light having been reflected from the first mirror 11. The light converged around its optical axis of incidence on the first mirror 11 is reflected from said first mirror 11 in a direction perpendicular to said optical axis of incidence toward the center of the second mirror 12 since the first mirror 11 is oriented at an angle of 45° with respect to said optical axis of incidence.

The first and the second mirrors 11, 12 are oriented so that their effective surfaces are orthogonal to each other.

The third mirror 13 is placed in an optically conjugate relationship with the second mirror 12, with respect to an axis extending in parallel with the optical axis of incidence, in other words, symmetrically with respect to the axis extending in parallel with said optical axis of incidence, so that the light having been reflected from the second mirror 12 toward the center of the third mirror 13 is then reflected from the third mirror 13 toward the center of the fourth mirror 14. Consequently, the light converged around its optical axis which has been reflected from the first mirror 11 is guided in parallel with but in a direction opposite to the light converged around its optical axis which has been reflected from the third mirror 13.

The fourth mirror 14 is placed immediately above the third mirror 13 but has its effective surface oriented orthogonal to that of the third mirror 13. Accordingly, the light converged around its optical axis which has been reflected from the third mirror 13 is reflected again from the fourth mirror 14 and guided along an optical path of exit toward an eyepiece 30 in parallel with the light converged around its optical axis which has entered the first mirror 11.

As apparent from the foregoing description, the optical system of inverse reflection on the object side comprising the first and second mirrors 11, 12 cooperates with the optical system of inverse reflection on the eyepiece side comprising the third and fourth mirrors 13, 14 to function equally to an optical system of inverse reflection/erection comprising a pair of trigonal prisms having their oblique planes serving as planes of reflection.

The invention is characterized by that these mirrors are combined together to construct a desired optical system of inverse reflection/erection, and that an object lens 20 is placed between the first mirror 11 and the second mirror 12. Such arrangement effectively eliminates the problem that the length of an optical path passing through a pair of prisms which have conventionally been employed as the optical system of inverse reflection/erection prevents the focal distance of the object lens from being shortened and, in consequence, allows the focal distance of the object lens to be shortened sufficiently not only to widen the field of view but also to shorten the full length of the optical system, and therefore, of the binocular. In this manner, the binocular can be constructed in a size as compact as desired.

To realize a binocular as lightweight as possible, the invention employs neither prisms tending to increase the weight of the binoculars nor optical system made of glasses arranged to repeat transmission and reflection, but employs plate-like specular reflectors as the optical system of inverse reflection. Specifically, each of the first through fourth mirrors according to the invention may be obtained preferably by forming a specular surface on sheet glass, for example, with metallic coating or by polishing the surface of sheet metal or providing such polished surface with metallic coating so that the surface thus treated may serve as the specular surface for reflection. While such measure eliminates various optical disadvantages due to refraction and reflection during transmission as well as transmission and refraction after reflection, such specular surface formed by metallic coating tends to be affected by ambient moisture and thus preferably should be coated with anticorrosive and moisture-proofing film.

The optical elements for reflection comprising the first through fourth mirrors 11–14 are made of sheet-like material as has been described above and therefore their initial positions tend to shift from their initial positions as time elapses under an influence of external forces such as external vibration if these mirrors are mounted on each barrel of the binocular one by one. To avoid this, it is preferred to mold the housing serving to hold the mirrors integrally with said mirrors by placing the respective mirrors at their predetermined positions within the mold for said housing before casting.

As a measure allowing the object of the invention to be more reliably achieved, an intermediate lens is further provided in the form of a collective lens adjacent to the exit side of said optical system of inverse reflection on the eyepiece side comprising the third and fourth mirrors 13, 14.

The intermediate lens 15 in the form of a collective lens is placed on the incident side of the eyepiece 30 and cooperates with the object lens 20 to shorten a composite focal distance. Addition of this intermediate lens 15 allows the field of view to be further widened, on one hand, and allows the eyepiece 30 to be shifted toward the incident side so as to flirter shorten the optical system as a whole, on the other hand. In this way, the total volume of the binocular can be further miniaturized.

While the specific embodiment of the invention has been described hereinabove, in reference with the accompanying drawings, with the object lens 20 being placed between the first specular reflector 11 and the second specular reflector 12 so as to be oriented orthogonal to the optical axis of reflection from said first specular reflector 11, the invention is not limited to this specific embodiment. As will be apparent to those skilled in the art from the foregoing description, it is possible to implement the invention in other various manners though not illustrated. Specifically, it is possible without departing from the spirit and the scope of the invention to place the object lens 20 between the third specular reflector 13 and the fourth specular reflector 14 so as to be oriented orthogonal to the optical axis of reflection from said third specular reflector 13, or to place the object lens 20 between the second specular reflector 12 and the third specular reflector 13 so as to be oriented orthogonal to the optical axis of reflection from said second specular reflector 12.

In addition to the alternative embodiments, it is also possible without departing from the spirit and the scope of the invention to place two or three object lenses on two or three optical axis of reflection each selected from three optical axis of reflection, i.e., the optical axis of reflection extending between the first specular reflector 11 and the second specular reflector 12, the optical axis of reflection extending between the second specular reflector 12 and the third specular reflector 13, and the optical axis of reflection extending between the third specular reflector 13 and the fourth specular reflector 14, so that each of the object lenses are oriented orthogonal to the corresponding optical axis of reflection.

As apparent from the foregoing description, the invention adopts the optical system of inverse reflection/erection comprising a plurality of lightweight specular reflectors and functioning equally to the system comprising massive prisms. The combination of the specular reflectors allows the object lens(es) to be placed within the space(s) defined between one or more pair(s) of the adjacent specular reflectors and thereby the focal distance of the object lens is effectively shortened to provide the bright and wide field of view.

The placement of the object lens(es) in the optical system comprising the lightweight specular reflectors not only allows the field of view to be widened but also allows the entire optical system to be lightweight and compact. As a consequence, the portability is improved and the physical burden resulting from continuously holding the binoculars for a long time is advantageously alleviated when the binoculars are used to see sports or theatrical performances.

Particularly, the combination of the intermediate lens with the object lens(es) is effective to further widen the field of view and simultaneously to achieve the desired compactness of the binoculars. Furthermore, optical stability for a long period of use is obtained by protecting the specular surfaces of the reflectors and molding the housing integrally with the specular reflectors.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector said so that the light converged around its optical axis of reflection is guided in parallel with said optical axis of incidence on said first specular reflector; an eyepiece placed behind the exit side of said optical system of inverse reflection on the eyepiece side; and an object lens placed in one of the respective optical paths of reflection extending from the first specular reflector to the fourth specular reflector so as to be oriented orthogonal to the corresponding optical axis of reflection.

2. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; and an object lens placed between the first and second specular reflectors so as to be oriented orthogonal to the optical axis of reflection from said first specular reflector.

3. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector said so that the light converged around its optical axis of reflection is guided in parallel with said optical axis of incidence on said first specular reflector; an eyepiece placed behind the exit side of said optical system of inverse reflection on the eyepiece side; and an object lens placed between the third and fourth specular reflectors so as to be oriented orthogonal to the optical axis of reflection from said third specular reflector.

4. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; and an object lens placed between the second and third specular reflectors so as to be oriented orthogonal to the optical axis of reflection from said second specular reflector.

5. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; and a plurality of object lenses respectively placed on a plurality of sections selected from a plurality of optical paths defined between respective pairs of adjacent specular reflectors.

6. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; said specular reflectors having their specular surfaces coated with anticorrosive and moisture-proofing film; and an object lens placed in one of the sections of the optical path extending from the first specular reflector to the fourth specular reflector, each of said sections being defined between each pair of adjacent specular reflectors, so as to be oriented orthogonal to the corresponding section of said optical path.

7. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; said specular reflectors having their specular surfaces coated with anticorrosive and moisture-proofing film; and an object lens placed between the first and second specular reflectors so as to be oriented orthogonal to the optical axis of reflection from said first specular reflector.

8. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; a housing arranged to hold said respective specular reflectors and molded integrally with said respective specular reflectors; and an object lens placed in one of the sections of the optical path extending from said first specular reflector to said fourth specular reflector, each of said sections being defined between each pair of adjacent specular reflectors, so as to be oriented orthogonal to the corresponding section of said optical path.

9. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; a housing arranged to hold said respective specular reflectors and molded integrally with said respective specular reflectors; and an object lens placed between the first and second specular reflectors so as to be oriented orthogonal to the optical axis of reflection from said first specular reflector.

10. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; an object lens placed in one of the sections of the optical path extending from the first specular reflector to the fourth specular reflector, each of said sections being defined between each pair of adjacent specular reflectors, so as to be oriented orthogonal to the corresponding section of said optical path; and an intermediate lens in the form of a collective lens placed adjacent the exit side of said fourth specular reflector.

11. A binocular low in power but wide in field of view having an optical system of inverse reflection on an object side comprising a first specular reflector placed at an angle of 45° with respect to an optical axis of incidence and a second specular reflector arranged to reflect the light having been reflected from said first specular reflector so that the light converged around its optical axis of reflection is guided in a direction orthogonal to said optical axis of incidence; an optical system of inverse reflection on an eyepiece side comprising a third specular reflector arranged to reflect the light having been reflected from said second specular reflector in parallel with but in a direction opposite to the light guided along the optical axis of incidence on said second specular reflector and a fourth specular reflector arranged to reflect the light having been reflected from said third specular reflector so that the light converged around its optical axis of reflection is guided in parallel with said optical axis of incidence on said first specular reflector; an eyepiece placed behind the exit side of said optical system of inverse reflection on the eyepiece side; an object lens placed between the first and second specular reflectors so as to be oriented orthogonal to the optical axis of reflection from said first specular reflector; and an intermediate lens in the form of a collective lens being placed adjacent the exit side of said fourth specular reflector.

* * * * *